US009225746B2

(12) United States Patent
Osborne et al.

(10) Patent No.: US 9,225,746 B2
(45) Date of Patent: Dec. 29, 2015

(54) TIMESTAMP SYSTEMS AND METHODS (71) Applicant: International Business Machines Corporation, Armonk, NY (US)

(72) Inventors: Michael C. Osborne, Richterswil (CH); James W. Sweeny, Millbrook, NY (US); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 14/104,831

(22) Filed: Dec. 12, 2013

(65) Prior Publication Data

US 2015/0172317 A1   Jun. 18, 2015

(51) Int. Cl.
*H04L 9/32*   (2006.01)
*H04L 29/06*   (2006.01)

(52) U.S. Cl.
CPC ............. *H04L 63/20* (2013.01); *H04L 9/3297* (2013.01)

(58) Field of Classification Search
CPC .............................. H04L 63/20; H04L 9/3297
USPC .......................................................... 713/178
See application file for complete search history.

(56) References Cited

U.S. PATENT DOCUMENTS

| 7,409,557 | B2 | 8/2008 | Teppler | |
|---|---|---|---|---|
| 7,702,909 | B2 | 4/2010 | Vainstein | |
| 2002/0056042 | A1* | 5/2002 | van der Kaay et al. | 713/178 |
| 2007/0115927 | A1 | 5/2007 | Pearson | |
| 2008/0022094 | A1* | 1/2008 | Gupta et al. | 713/165 |
| 2010/0118793 | A1* | 5/2010 | Horn et al. | 370/329 |
| 2014/0029611 | A1* | 1/2014 | Huang et al. | 370/389 |
| 2014/0095887 | A1* | 4/2014 | Nayshtut et al. | 713/189 |

FOREIGN PATENT DOCUMENTS

| EP | 1841124 A1 | 10/2007 |
|---|---|---|
| JP | 2011082727 A | 4/2011 |

OTHER PUBLICATIONS

Huhnlein, Detlef "How to Qualify electronic signatures and time stamps", Lecture Notes in Computer Science, 2004, v. 3093/2004, 606, 9 pages.
Minocci, "Developing Secure Applications using Hardware Security Modules," Thesis, Southern Connecticut State University, 2007, 84 pages.
Yavus et al., "HIMUTSIS: Heirarchical Multi-Tier Adaptive Ad-Hoc Network Security Protocol Based on igncryption Type Key Exchange Schemes," ISCIS 2006, LNCS 4263, pp. 434-444, 2006.

* cited by examiner

*Primary Examiner* — Aravind Moorthy
(74) *Attorney, Agent, or Firm* — Cantor Colburn LLP; William A. Kinnaman, Jr.

(57) ABSTRACT

According to some exemplary embodiments, a computer-implemented timestamp method includes maintaining, at a cryptographic service provider (CSP), one or more timestamp policies specifying when digital timestamps should be issued. A timestamp request is received at the CSP from a timestamp authority that manages timestamping and is accompanied by a corresponding timestamp data structure. With a computer processor, a difference is determined between a first time specified in the timestamp data structure and a second time indicated by an internal clock of the CSP. The timestamp request is rejected if the first timestamp data structure fails to comply with a predetermined timestamp policy, where the predetermined timestamp policy requires that the difference between the first time and the second time be below a predetermined threshold.

20 Claims, 3 Drawing Sheets

TIMESTAMP SYSTEMS AND METHODS

BACKGROUND

Various embodiments of this disclosure relate to digital timestamping and, more particularly, to integrating high-assurance timestamping into cryptographic service providers (CSPs).

Digital timestamps are dedicated uses of digital signatures, in which digital signatures tie document content or events to a specific date and time. Digital signatures attest to the specific content being available at the given time with security assurances provided by the timestamping environment.

Due to the complexity of timestamp issuance high-assurance timestamp servers are generally deployed as dedicated appliances, and may not be easily integrated into servers. In restricted enterprise environments, adding these dedicated appliances, which have their own access control requirements, may be problematic. This problem is compounded for servers hosting a multiple consolidated virtual systems, if they expect a corresponding large number of timestamp-issuing appliances.

SUMMARY

In one embodiment of this disclosure, a computer-implemented timestamp method includes maintaining, at a CSP, one or more timestamp policies specifying when digital timestamps should be issued. A timestamp request is received at the CSP from a timestamp authority that manages timestamping and is accompanied by a corresponding timestamp data structure. With a computer processor, a difference is determined between a first time specified in the timestamp data structure and a second time indicated by an internal clock of the CSP. The timestamp request is rejected if the first timestamp data structure fails to comply with a predetermined timestamp policy, where the predetermined timestamp policy requires that the difference between the first time and the second time be below a predetermined threshold.

In another embodiment, a timestamp system includes a CSP and a computer processor. The CSP is configured to maintain one or more timestamp policies specifying when digital timestamps should be issued, and to receive a timestamp request transmitted from a timestamp authority, the timestamp request being accompanied by a corresponding timestamp data structure. The computer processor is configured to determine a difference between a first time specified in the timestamp data structure and a second time indicated by an internal clock of the CSP. The CSP is further configured to reject the timestamp request if the timestamp data structure fails to comply with a predetermined timestamp policy, where the predetermined timestamp policy requires that the difference between the first time and the second time be below a predetermined threshold.

In yet another embodiment, a computer program product includes a computer readable storage medium having computer readable program code embodied thereon. The computer readable program code is executable by a processor to perform a method. The method includes maintaining, at a CSP, one or more timestamp policies specifying when digital timestamps should be issued. According to the method, a timestamp request is received at the CSP from a timestamp authority that manages timestamping and is accompanied by a corresponding timestamp data structure. With a computer processor, a difference is determined between a first time specified in the timestamp data structure and a second time indicated by an internal clock of the CSP. The timestamp request is rejected if the first timestamp data structure fails to comply with a predetermined timestamp policy, where the predetermined timestamp policy requires that the difference between the first time and the second time be below a predetermined threshold.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Timestamp systems and methods, according to some embodiments of this disclosure, may issue high-assurance timestamps and may be integrated into standalone CSPs, such as hardware security modules (HSMs). An exemplary timestamp system may generate timestamps securely while delegating at least a portion of timestamp construction to a host, which need not be a trusted host. The signing hardware of an exemplary timestamp system may be a customized version of the commodity CSP. Since this exemplary timestamp system adds only minor extensions of types already foreseen by the CSP, the augmented CSP that results may continue to be used by applications unaware of the timestamp-specific additions.

Thus, the timestamp system may be easily integrated into a server-internal HSM without necessitating a standalone appliance. Further, the timestamp system may be managed through in-band administrative traffic and, therefore, may be deployed without adding service channels to the CSP.

Figure 1:
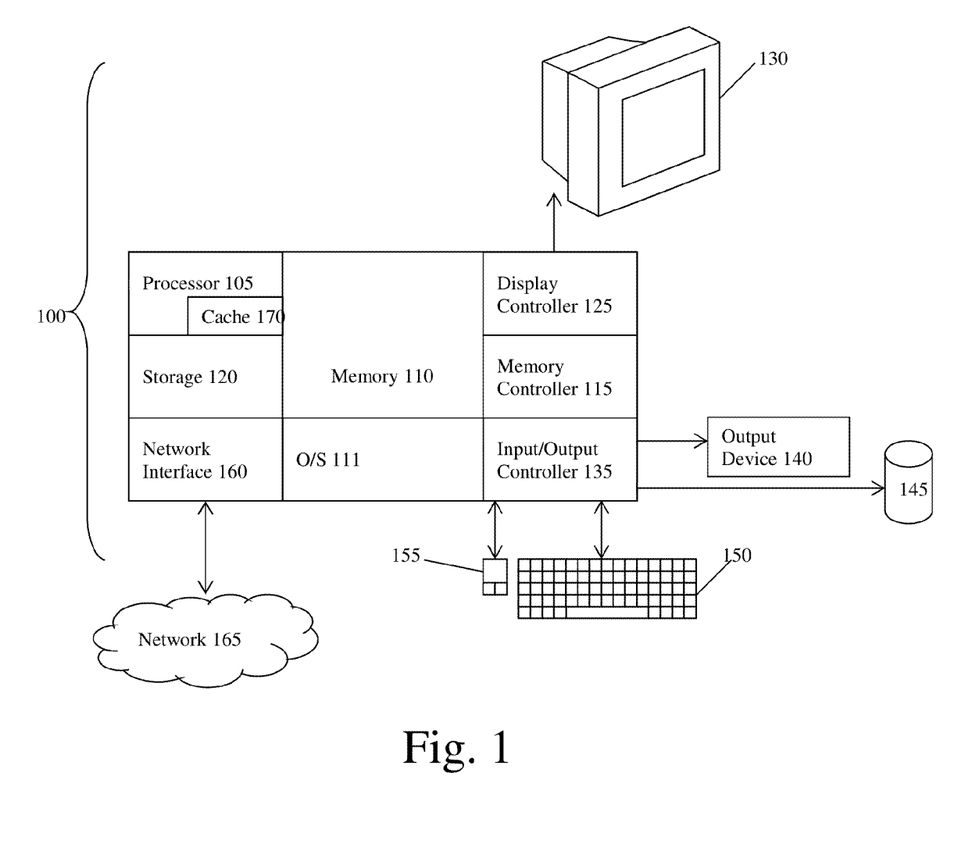
FIG. 1 is a block diagram of a computing device for performing one or more aspects of a timestamp system, according to an exemplary embodiment of this disclosure.

FIG. 1 illustrates a block diagram of a computer system 100 for use in implementing a timestamp system or method according to some embodiments. The timestamp systems and methods described herein may be implemented in hardware, software (e.g., firmware), or a combination thereof. In an exemplary embodiment, the systems and methods described may be implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Timestamp systems and methods according to this disclosure may be embodied, in whole or in part, in computer program products or in computer systems 100, such as that illustrated in FIG. 1.

Figure 2:
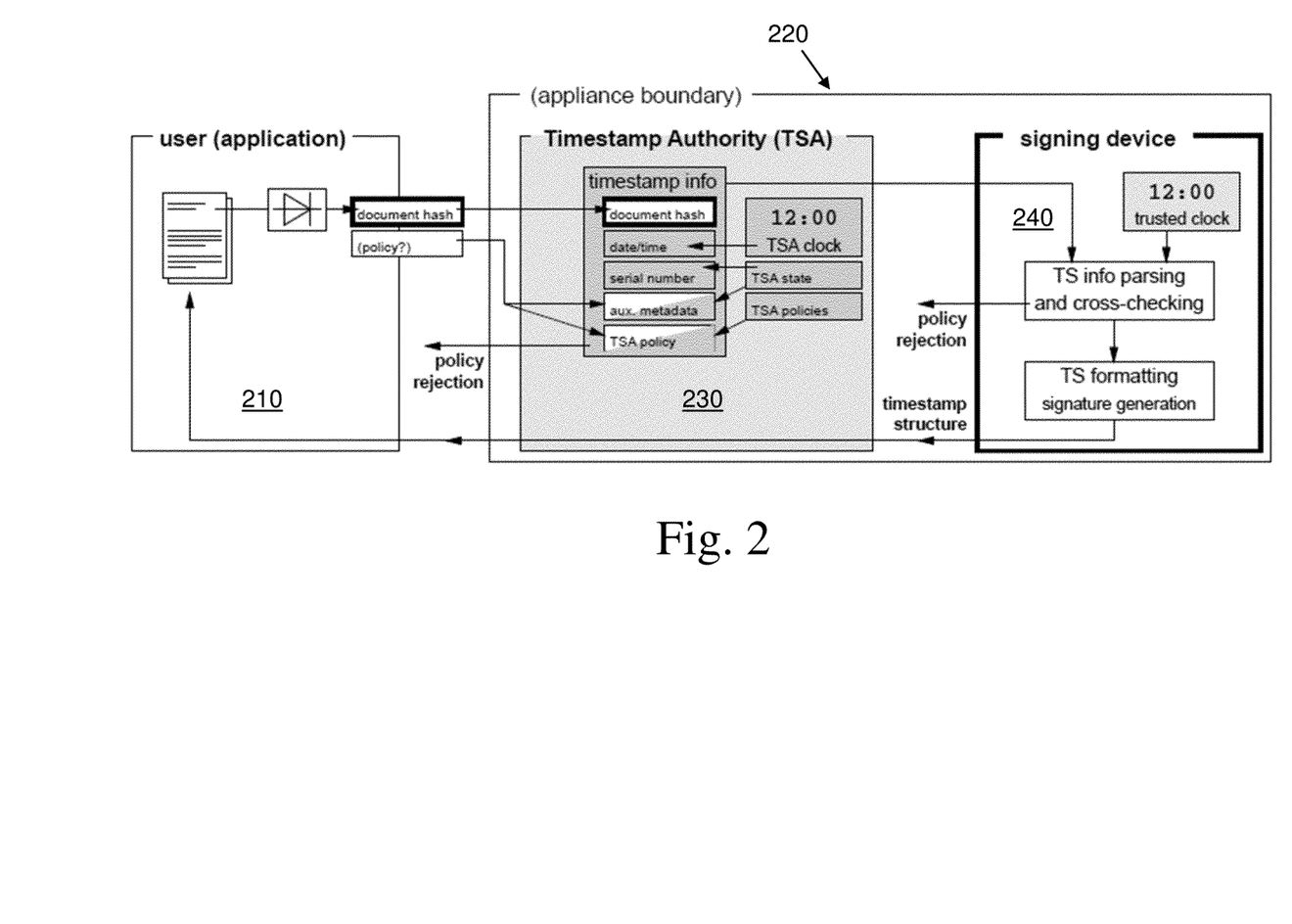
FIG. 2 is a block diagram of a high-assurance signing device, of which the timestamp system may be a modification, according to an exemplary embodiment of this disclosure.

FIG. 2 illustrates a high-assurance signing device, of which the timestamp system 300 (FIG. 3) may be a modification, according to an exemplary embodiment of this disclosure. A user application 210, such as a timestamp service, may generate a fingerprint of a document to be signed. The fingerprint may be cryptographically strong, such as a document-specific value generated through a cryptographic hash function. Other methods of generating the fingerprint may also be used, according to conventional methods, so long as the methods can be repeated with the same results for verification purposes.

The user application 210 may provide the document fingerprint, either by generating it or receiving it from another application. The user application 210 may transmit a timestamp request to a timestamp appliance 220. The timestamp request may include the fingerprint, as well as related metadata. The metadata may include, for example, a description of a requested signing policy, timestamp fields, or document attributes.

The timestamp appliance 220 may include a timestamp authority (TSA) 230 and a signing device 240. The TSA 230 may analyze the request and determine whether or not to issue a timestamp, based on the content of the request and predefined timestamp requirements. A signature may be issued if the request is accepted, and a rejection may be issued otherwise.

If the TSA 230 accepts the timestamp request, it may construct a timestamp data structure containing the following, for example: the document fingerprint, a timestamp serial number, a date and time as determined by the TSA 230, an indication of the TSA's clock accuracy with respect to the date and time (e.g., an indication of the potential inaccuracy in the date and time), and the timestamp issuance policy requested. This data structure may be passed to the signing device 240.

The signing device 240 may insert the data structure into a digital signature envelope and then sign the data structure. In a conventional, dedicated timestamp appliance, the signing device may apply minimal checking to the data structure, trusting the rest of the TSA 230 to provide signable data. In these appliances 220, where the signing device 240 trusts the TSA 230 completely, the issued timestamp complies only with the potentially lower assurance level of the TSA 230, and not that of the more secure signing device 240. Depending on the timestamp request metadata and the TSA 230 implementation, the resulting signed timestamp in response to the user application 210 may either include all metadata necessary for standalone verification, or verification of the signed timestamp may require published supplementary information, such as published certificate chains.

Figure 3:
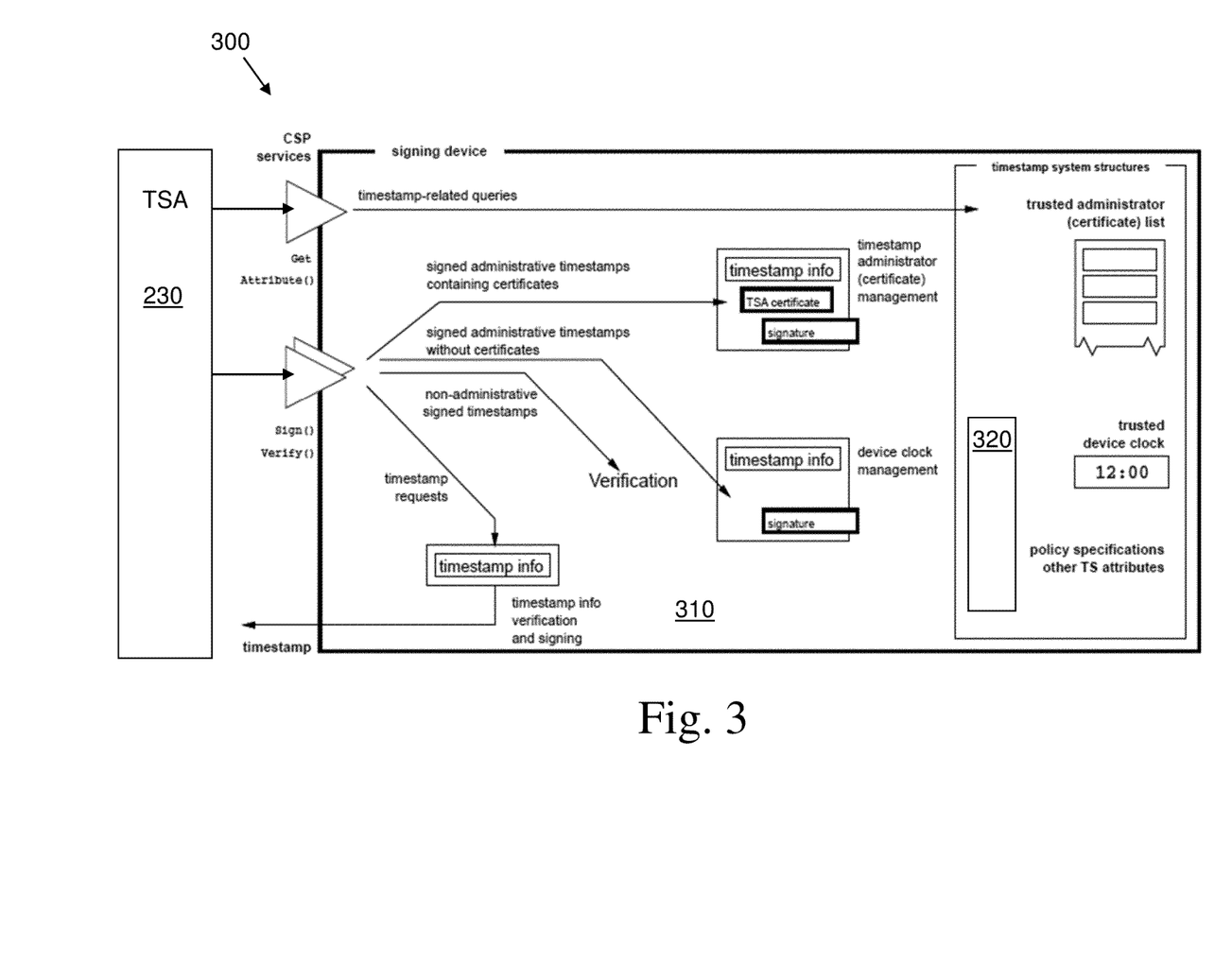
FIG. 3 is a diagram of a timestamp system, according to an exemplary embodiment of this disclosure.

FIG. 3 illustrates a timestamp system 300, according to an exemplary embodiment of this disclosure. An exemplary embodiment of the timestamp system 300 is a modification of the above-described system in FIG. 2. The timestamp system 300 may use a customizable, standalone CSP 310 as the signing device 240. Timestamps may be generated securely while delegating much of timestamp construction to an untrusted TSA 230. Minor extensions may be added to the CSP 310 to achieve these results, but extensions of this kind may be foreseen by the CSP manufacturers. Thus, the CSP 310 may continue to be used by applications unaware of timestamp-specific additions. The timestamp system may include a limited number of attributes dedicated to timestamping, transparently integrated into the CSP 310. In an exemplary embodiment, these additional attributes are custom attributes and restrictions on data input formats. Since the signing hardware may be a customized version of a commodity CSP, this hardware can be easily integrated into server-internal HSMs, not necessitating standalone appliances. Further, the timestamp system 300 may be managed through in-band administrative traffic, and may therefore be deployed without adding service channels.

The timestamp system 300 need not require management channels or other caller-visible additions to the CSP application programming interface (API). Rather, specially annotated timestamp data structures may be used to pass administrative instructions to the CSP 310. The timestamp system 300 may be managed through in-band signaling embedded in the timestamp request flow. As a result of this signaling, the system may react in a context-aware manner. Because the system 300 may extend its host CSP 310 using this signaling, and because it need not add new functions to the TSA's API, the timestamp functionality may be transparently added to the CSP 310, preserving binary compatibility with existing users of the CSP 310.

As described above with respect to FIG. 2, the TSA 230 may provide to the CSP 310 a timestamp data structure corresponding to a timestamp request not rejected by the TSA 230. According to some exemplary embodiments, the CSP 310 may crosscheck input from the TSA 230. This crosschecking may be used to verify, among other things, that the TSA's claimed date and time is sufficiently accurate as compared to a predetermined maximum difference between the claimed date and time and the CSP's internal date and time. Because the CSP 310 ensures that the TSA's input is sufficient with respect to the CSP's predetermined standards, the timestamp system 300 may inherit the security assurance the CSP 310. In other words, the timestamp system 300 may be as secure as the CSP 310 regardless of a lower TSA security assurance level. This higher level of security may be the case even if some or most of timestamp construction occurs within the TSA. This is an improvement over conventional systems, which can be deemed no more secure than the TSA 230 if the CSP does not take part in policy enforcement.

An exemplary timestamp system 300 may be built on top of an existing CSP 310, requiring orthogonal additions to the CSP of the type generally foreseen by CSP designers. Thus, the extensions may avoid interference with unrelated applications. For example, one or more extensions may be added to the CSP 310.

A first added extension may be a custom attribute dedicating keys to timestamping. Modular CSPs allow built-in methods of specifying extended attributes and key types. In an exemplary embodiment, a CSP-wide Boolean attribute may be added and used to restrict a CSP object to signing timestamp requests, with such keys rejecting any other kind of input data. In other words, the Boolean value, which can have either a true value or a false value at a given time for the corresponding request, indicates to the CSP 310 whether the request is to be signed. If a request is not suited for signing or is not a timestamp request, the TSA 230 may set that value to false, thus indicating that the CSP 310 should not sign in response to the request and corresponding data. In an exemplary embodiment, this attribute may be added to the CSP 310 without impacting other CSP attributes.

In some embodiments, custom attributes added to the CSP 310 for use in the timestamp system 300 may be restricted to a subset of partitions within the CSP 310. In that case, to prevent use of these custom attributes by requests to the CSP 310 that are deemed not to be timestamp-related (e.g., such as those requests where the above Boolean value is set to false), such requests may be routed to partitions outside of this selected subset of partitions. While this would prevent use of general-purpose CSP objects within the subset reserved for timestamping, it may also provide sufficient separation between timestamp attributes and generic attributes where required.

A second extension to the CSP 310 may be an attribute indicating an allowable clock drift. Timestamp data structures that reference dates and times differing from the CSP clock by an amount of time that exceeds the value of this attribute may be rejected for signing, thus allowing the CSP 310 to prevent the timestamp system 300 from issuing out-of-date timestamps. In some embodiment, the timestamp system 300 may maintain transaction counters and failure history due to excess time drift. As a result, policy rejections and key expiration may be reliably audited by the TSA 230.

The CSP 310 may be extended to enforce one or more signing policies. Assuming policy decisions can be described in terms of properties of timestamp requests and the signing keys, the timestamp system 300 may describe conditions such as the following: signing keys may be restricted in the policies they accept, forming a compatibility matrix of keys versus policies; policies may only be accepted for predefined groups of keys, such as keys of certain strength or key type; and keys may be restricted based on current time or key age. More generally, the timestamp system 300 may combine signing policies with key lifecycle rules, for example, to result in time-based key retirement. The above are not a limiting set of policies. Rather, signing policy rules may be formulated with straightforward additions to the set of timestamp-specific attributes. Further, when the CSP 310 crosschecks policies, it may return dedicated errors, such as describing a key being rejected due to its certificate being expired.

It will be understood by one skilled in the art that, in some cases, policy additions may be relevant to both the TSA 230 and the CSP 310. This disclosure, however, focuses on the subset of extensions that may be observed and enforced by the CSP 310. Attribute enforcement at the TSA 230 may have a lower level of assurance, so in exemplary embodiments, additional enforcement may be required by the CSP 310.

A management interface 320 may be added to the CSP 310 to interact with the custom attributes. In a modular CSP, standard management interfaces are assumed to tolerate extended attributes without customization. An exemplary timestamp system 300 may therefore be based on existing services, so long as the modular CSP is properly implemented. For applications 210 using the CSP 310 for other than timestamping service, these custom attributes would be opaque and ignored.

The timestamp system 300 may establish interaction rules between standard attributes (i.e., those packaged with the CSP 310) and custom ones (i.e., those added to implement various aspects of this disclosure). In an exemplary embodiment, the custom attributes may be orthogonal to the standard attributes. Further, the timestamp system 300 may impose few restrictions not already standard in the CSP 310. These restrictions may include, for example, enabling signing only of timestamp requests and no other requests, or preventing timestamp keys from being exported.

The timestamp system 300 may enforce a defined timestamp format, which may include date/time updates and administrator certificates in the timestamp data stream. The timestamp format may include specialized metadata or attributes, enabling unambiguous distinguishing between timestamp requests and administrative traffic. For example, a conventional timestamp format may generally provide standardized metadata attributes with special meaning for timestamp use. Upon seeing these specific metadata, the TSA 230 may flag this traffic as administrative, so that the signing device does not attempt to sign that traffic. This flagging may be implemented using, for example, the Boolean variable mentioned above. As a result, the timestamp system 300 may include, in the CSP 310, a multiplexing function that (1) detects the administrative traffic related to timestamping and (2) dispatches this traffic to internal timestamp handler. The CSP 310 itself need have only a passive understanding of timestamp formats, allowing the TSA 230 to construct the timestamp data structures with the required extensions. Thus, most of the knowledge of timestamp format details may be delegated to user applications 210, while the CSP 310 may require only minimal parsing capabilities.

The timestamp system 100 may be administrated in-band, i.e., inside pre-established communication methods or channels. For example, and not by way of limitation, the timestamp system 300 may include administrative support through specially formatted requests for one or more of the following: management of administrative certificates, such as addition or revocation; setting the absolute time; and setting time through incremental relative updates.

Since conventional timestamps often already include metadata and certificate data, these timestamps may be easily adapted to incorporate administrative traffic encapsulated in the timestamp data structure, which can be sent through the same channels as timestamp requests and responses. An exemplary timestamp system 300 may therefore embed administrative traffic as timestamp data structures, such as those passed to the CSP 310 for verification. In that case, the CSP 310 may interpret the timestamp data structure as administrative traffic and handle it accordingly.

The CSP 310 follow predetermined guidelines for determining when a timestamp structure is to be classified as administrative traffic. For example, the timestamp structure may need to be pre-signed by authorized administrators, based on a whitelist of administrators retained within the CSP 310. If administrative traffic is required to be approved by two or more administrators, such as for security purposes, the CSP 310 may identify the two or more required signatures or certificates.

Some timestamp requests and corresponding timestamp data structures, including administrative traffic, may be accompanied by an administrative certificate. In an exemplary embodiment, these certificates may need to be changed on a regular basis to maintain security. To that end, the timestamp system 300 may enforce restrictions on the use counts of signing keys, useable time window of signing keys, or a combination thereof. Such restrictions may, in some embodiments, be communicated in-band through timestamp data structures. Alternatively, these restrictions may be fixed parameters of the CSP 310.

The administrator whitelist may be managed through administrative traffic, where administrator listings may be added or removed according to timestamp structures that meet the current conditions for being classified as administrative traffic. Metadata in the timestamp data structure may unambiguously identify the sub-category of administrative service requested, thus enabling the CSP 310 to handle the administrative traffic as intended. For example, and not by way of limitation, a timestamp structure may indicate through its metadata that it carries an update to the current date and time tracked by the CSP 310. In that case, the timestamp data structure may include the new official time, or incremental change in time, in the standard date/time field of the data structure. CSP extensions may allow full management of administrator lifecycle, including introduction, renewal, removal of certificates, and may also allow updates to the CSP clock state, based on this multiplexing of the communication channel used for timestamp requests. Because predetermined metadata standards prescribe attribute usage and interpretation, administrative traffic may be unambiguously identified while, at the format level, this traffic may appear to be simple timestamp traffic submitted for verification. Thus, format-aware filters built into the CSP 310 may allow this traffic to pass, enabling the CSP 310 to receive it and act accordingly.

To provide accurate signed timestamps, it is desirable for the timestamp system 300 to keep accurate time. To maintain that accuracy, a method may be implemented to periodically update the absolute time as known to the timestamp system 300. As mentioned above, administrative traffic may be used to set the current time for future timestamp requests. In conventional timestamp systems with high and variable latencies, as a result of uncertain propagation delays between submitting a request and reacting to it, incremental shift-time may be provided through administrative traffic, rather than absolute time updates. While incremental shifts still require some knowledge of latencies to result in accurate time, they can provide increased accuracy.

An exemplary timestamp system 300 may be deployed by a rate-limited, authenticated time-adjustment service to compensate for long-term drift. An unauthenticated service may be used, allowing only infrequent incremental updates, such as compensating a few seconds worth of drift once per predetermined number of days (e.g., several times a week). This limited drift compensation would prevent rogue host entities from substantially changing the signing-device clock, or would at least limit potential changes, but might fully compensate the drift of high-quality commodity clocks. Alternatively, a rate-limited service without authentication may be used by automated infrastructure jobs to minimize signing-device drift. The rate-limited service may also accept "no shift" as a special operation while still prohibiting changes for the permitted window. The no-shift operation may allow the infrastructure job to prevent other processes from modifying the clock in the next adjustment window if there is no current need.

Administrator-assisted clock adjustments may be similar in operation to authenticated network time protocol (NTP) updates, which are used to synchronize clock updates of high-end conventional timestamp products. However, since an exemplary embodiment of the timestamp system 300 decouples the authentication of time updates from that of the NTP protocol, the complexity of NTP server authentication may be removed from the timestamp system 300, which simplifies the trust management. Further, because the incremental clock-adjustment process closely resembles that of authenticated NTP, the timestamp system 300 may be adapted for services of high-assurance time-source management systems.

In some embodiments, as a side effect of not relying on NTP authentication, the timestamp system 300 may need to replicate some of the functionality otherwise available to authenticated NTP. For example, with respect to latency measurements, when communicating relative clock shifts, the timestamp system 300 may locally measure or estimate administrator-to-device-clock latency, whereas this measurement would be automatically derived by a full NTP implementation.

Thus, an exemplary embodiment of the timestamp system 300 has some awareness of the latency between a timestamp data structure's creation by the TSA 230 and the time of signing the data structure by the CSP 310. Knowledge of this latency may enable the CSP 310 to more accurately set its internal clock when the updates to the current time are received through administrative traffic.

To simplify measurement of local latencies and their variation, the CSP 310 may include a "pseudo-update" service, which does not modify the timestamp data structure but instead performs loopback verification of the data structure by calling back to the TSA 230. This loopback service may allow high-resolution calibration of latencies without security concerns, as the necessary measurements could be carried out without changing the timestamp data structure. The loopback service may also be used to measure host and input/output device latencies, and thereby facilitating deployment even with significant latency or variation outside the CSP 310, such as may be the case in distributed or replicated TSAs 230.

Since administration may be performed in-band, the timestamp system 300 may be deployed even in high-assurance distributed systems. Embedding administrative traffic within the timestamp data structures, the timestamp system 300 may be deployed even when network security rules, access controls, or filtering would prohibit adding administrative channels, opening ports, or establishing new message types.

The above-described minor additions to the CSP 310 may allow efficient synchronization of reference clocks, which synchronization may even be automated without forcing administrator intervention. These additions may also enable the CSP 310 to crosscheck the TSA 230, thus providing high-assurance timestamping.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   maintaining, at a cryptographic service provider (CSP), two or more timestamp policies specifying when digital timestamps should be issued, each of the two or more timestamp policies being associated with one or more signing keys;
   receiving, at the CSP, a timestamp request transmitted from an untrusted timestamp authority that manages timestamping, the untrusted timestamp authority having a lower assurance than the CSP, and the timestamp request being accompanied by a first timestamp data structure from the untrusted timestamp authority and referencing a first timestamp policy of the two or more timestamp policies;
   determining, with a computer processor, a difference between a first time specified by the untrusted timestamp authority in the first timestamp data structure and a second time indicated by an internal clock of the CSP;
   rejecting the timestamp request if the first timestamp data structure fails to comply with the first timestamp policy, wherein the first timestamp policy requires at least that the difference between the first time and the second time be below a predetermined threshold; and
   signing the first data structure with a first signing key, of the one or more signing keys associated with the first timestamp policy, if the first timestamp data structure complies with the first timestamp policy.

2. The method of claim 1, further comprising multiplexing a communication channel between the CSP and the timestamp authority, wherein administrative traffic and a plurality of timestamp requests share the communication channel.

3. The method of claim 2, further comprising:
   receiving, at the CSP, a second timestamp data structure; and
   identifying the second timestamp data structure as in-band administrative traffic.

4. The method of claim 3, further comprising updating the internal clock of the CSP based on the timestamp data structure identified as administrative traffic.

5. The method of claim 1, wherein the CSP performs timestamp services and non-timestamp services.

6. The method of claim 5, wherein one or more timestamp-related attributes of the CSP are isolated in one or more partitions of the CSP that are directed toward timestamp services, and wherein one or more other partitions of the CSP perform only non-timestamp services.

7. The method of claim 6, further comprising directing non-timestamp traffic to the one or more other partitions of the CSP.

8. A timestamp system, comprising:
   a cryptographic service provider (CSP) configured to
      maintain two or more timestamp policies specifying when digital timestamps should be issued, each of the two or more timestamp policies being associated with one or more signing keys; and
      receive a timestamp request transmitted from an untrusted timestamp authority that manages timestamping, the untrusted timestamp authority having a lower assurance than the CSP, and the timestamp request being accompanied by a first timestamp data structure referencing a first timestamp policy of the two or more timestamp policies; and
   a computer processor configured to determine a difference between a first time specified in the first timestamp data structure by the untrusted timestamp authority and a second time indicated by an internal clock of the CSP;
   wherein the CSP is further configured to:
      reject the timestamp request if the first timestamp data structure fails to comply with the first timestamp policy, wherein the first timestamp policy requires at least that the difference between the first time and the second time be below a predetermined threshold; and sign the first data structure with a first signing key, of the one or more signing keys associated with the first timestamp policy, if the first timestamp data structure complies with the first timestamp policy.

9. The timestamp system of claim 8, the CSP being further configured to multiplex a communication channel between the CSP and the timestamp authority, wherein administrative traffic and a plurality of timestamp requests share the communication channel.

10. The timestamp system of claim 9, the CSP being further configured to receive a second timestamp data structure, and to identify the second timestamp data structure as in-band administrative traffic.

11. The timestamp system of claim 10, the CSP being further configured to update its internal clock based on the timestamp data structure identified as administrative traffic.

12. The timestamp system of claim 8, the CSP being further configured to perform timestamp services and non-timestamp services.

13. The timestamp system of claim 12, wherein one or more timestamp-related attributes of the CSP are isolated in one or more partitions of the CSP that are directed toward timestamp services, and wherein one or more other partitions of the CSP perform only non-timestamp services.

14. The timestamp system of claim 13, the CSP being further configured to direct non-timestamp traffic to the one or more other partitions of the CSP.

15. A computer program product comprising a non-transitory computer readable storage medium having computer readable program code embodied thereon, the computer readable program code executable by a processor to perform a method, comprising:

maintaining, at a cryptographic service provider (CSP), two or more timestamp policies specifying when digital timestamps should be issued, each of the two or more timestamp policies being associated with one or more signing keys;

receiving, at the CSP, a timestamp request transmitted from an untrusted timestamp authority that manages timestamping, the untrusted timestamp authority having a lower assurance than the CSP, and the timestamp request being accompanied by a first timestamp data structure referencing a first timestamp policy of the two or more timestamp policies;

determining a difference between a first time specified by the untrusted timestamp authority in the first timestamp data structure and a second time indicated by an internal clock of the CSP;

rejecting the timestamp request if the first timestamp data structure fails to comply with the first timestamp policy, wherein the first timestamp policy requires at least that the difference between the first time and the second time be below a predetermined threshold; and signing the first data structure with a first signing key, of the one or more signing keys associated with the first timestamp policy, if the first timestamp data structure complies with the first timestamp policy.

16. The computer program product of claim 15, the method further comprising:

receiving, at the CSP, a second timestamp data structure; and identifying the second timestamp data structure as in-band administrative traffic.

17. The computer program product of claim 16, the method further comprising updating the internal clock of the CSP based on the timestamp data structure identified as administrative traffic.

18. The computer program product of claim 15, wherein the CSP performs timestamp services and non-timestamp services.

19. The computer program product of claim 18, wherein one or more timestamp-related attributes of the CSP are isolated in one or more partitions of the CSP that are directed toward timestamp services, and wherein one or more other partitions of the CSP perform only non-timestamp services.

20. The computer program product of claim 19, the method further comprising directing non-timestamp traffic to the one or more other partitions of the CSP.

* * * * *